US009944155B2

(12) United States Patent
Lewis et al.

(10) Patent No.: US 9,944,155 B2
(45) Date of Patent: Apr. 17, 2018

(54) LIFT ASSIST MECHANISM FOR SOFT TOP

(71) Applicant: Bestop, Inc., Louisville, CO (US)

(72) Inventors: Stephen J. Lewis, Harrison Township, MI (US); Duane C. Junkin, Madison Heights, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/128,773

(22) PCT Filed: Mar. 26, 2015

(86) PCT No.: PCT/US2015/022716
§ 371 (c)(1),
(2) Date: Sep. 23, 2016

(87) PCT Pub. No.: WO2015/148791
PCT Pub. Date: Oct. 1, 2015

(65) Prior Publication Data
US 2017/0174062 A1 Jun. 22, 2017

Related U.S. Application Data

(60) Provisional application No. 61/970,463, filed on Mar. 26, 2014.

(51) Int. Cl.
*B60J 7/12* (2006.01)
(52) U.S. Cl.
CPC .................. *B60J 7/1291* (2013.01)
(58) Field of Classification Search
CPC ..... B60J 7/1291; B60J 7/08; B60J 7/12; B60J 7/1204; B60J 7/1234; B60J 7/1239;
(Continued)

(56) References Cited

U.S. PATENT DOCUMENTS 6,409,247 B1  6/2002  Maass
2001/0030443 A1  10/2001  Barker
(Continued)

FOREIGN PATENT DOCUMENTS

BE   350963 A    4/1928
DE   10102643 A1  7/2002
(Continued)

OTHER PUBLICATIONS

International Search Report for Application No. PCT/US2015/022716, dated Jun. 12, 2015.

*Primary Examiner* — Dennis H Pedder
(74) *Attorney, Agent, or Firm* — Warn Partners, P.C.

(57) ABSTRACT

A frame and soft top assembly which includes lift assist and improved fabric management. The assembly includes a pair of front arms pivotally attached to rear side rails and are attached to the vehicle roll bar. A plurality of fabric control bows connected with pivot links provide fabric control to the top material during pivoting of the front side rails. A pair of bow pivot links are pivotally connected to the rear side rail. A rear gas strut and a front gas strut are attached longitudinally to either side of the pair of bow pivot links, one providing lift assistance at the start of the pivotal opening of the sunroof while the other of the struts gets loaded as the top is deployed and buffers the closing of the roof which also loads the strut to provide assistance in the closing direction when it is time to close the sunroof.

18 Claims, 7 Drawing Sheets

(58) Field of Classification Search
CPC ...... B60J 7/1243; B60J 7/1247; B60J 7/1252; B60J 7/1265
USPC .......................................... 296/219, 107.16
See application file for complete search history.

(56) References Cited

U.S. PATENT DOCUMENTS

| | | |
|---|---|---|
| 2004/0108747 A1 | 6/2004 | Obendiek |
| 2012/0098292 A1 | 4/2012 | Huotari et al. |
| 2012/0286540 A1 | 11/2012 | Moran et al. |

FOREIGN PATENT DOCUMENTS

| | | |
|---|---|---|
| GB | 311081 A | 5/1929 |
| GB | 336514 A | 10/1930 |
| WO | 2004056596 A2 | 7/2004 |

LIFT ASSIST MECHANISM FOR SOFT TOP

CROSS-REFERENCE TO RELATED APPLICATIONS

This application is a National Stage of International Application No. PCT/US2015/022716, filed Mar. 26, 2015, which claims priority to U.S. Provisional Patent Application No. 61/970,463 filed Mar. 26, 2014. The disclosure of the above application are incorporated herein by reference.

FIELD OF THE INVENTION

The present invention relates to a folding sunroof for a soft top of a vehicle.

BACKGROUND OF THE INVENTION

Foldable soft tops for SUV vehicles are known in the art. These tops provide a vehicle with an open air experience with the top folded back or provide protection from the elements with the top folded forward. Such tops are typically manually retractable and during retraction the operator has to perform a series of manipulation of the top. Additionally, manual management and stowage of the fabric materials of the top during folding must be accomplished.

Thus, in order for a vehicle operator to facilitate opening of the soft top in order to provide the open air vehicle feeling the operator must be outside the vehicle to manipulate the soft top. Therefore, in recent years a soft top "sunroof" has become a well-received option for folding SUV soft tops. This "sunroof" typically folds back from within the vehicle such that the operator can readily provide an open air experience without folding back the entire soft top. An example of such a soft top is the Sunrider soft top by Bestop, the assignee herein which provides a front "sunroof" portion of the top which folds back for revealing an open air sunroof feeling for the vehicle.

While this sunroof option has become a very desirable feature, it does require considerable force at the start of the deployment due to the operator's angle of attack. The mass of the frame mechanism for folding the top cover fabric and fabric becoming trapped in the frame mechanism linkage are additional concerns. Also, fabric management is occasionally problematic in that the fabric can become entangled or interfere with the frame mechanism of the top.

Therefore, there remains a need in the art to provide a sunroof deployment mechanism that provides easier opening and improved fabric management.

SUMMARY OF THE INVENTION

In accordance with the present invention, there is provided a frame and soft top assembly which includes lift assist and improved fabric management. The assembly includes a pair of front side arms pivotally attached to rear side rails. The rear side rails are attached to the vehicle roll bar. A plurality of control bows are operably connected with pivot links to provide fabric control to the top material during pivoting of the front side rails. A pair of the bow pivot links being pivotally connected to the rear side rail. A rear gas strut and a front gas strut are attached longitudinally to either side of the said pair of bow pivot links such that one is closed and preloaded when the sunroof is in its closed position and upon opening the sunroof the preloaded strut provides lift assistance at the start of the pivotal opening of the sunroof the other of the struts gets loaded as the top is deployed and buffers the closing of the roof which also loads the strut to provide assistance in the closing direction when it is time to close the sunroof. Extra lateral bows are provided which provide management of the fabric thereby keeping the fabric out of the mechanism during opening and closing of the sunroof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
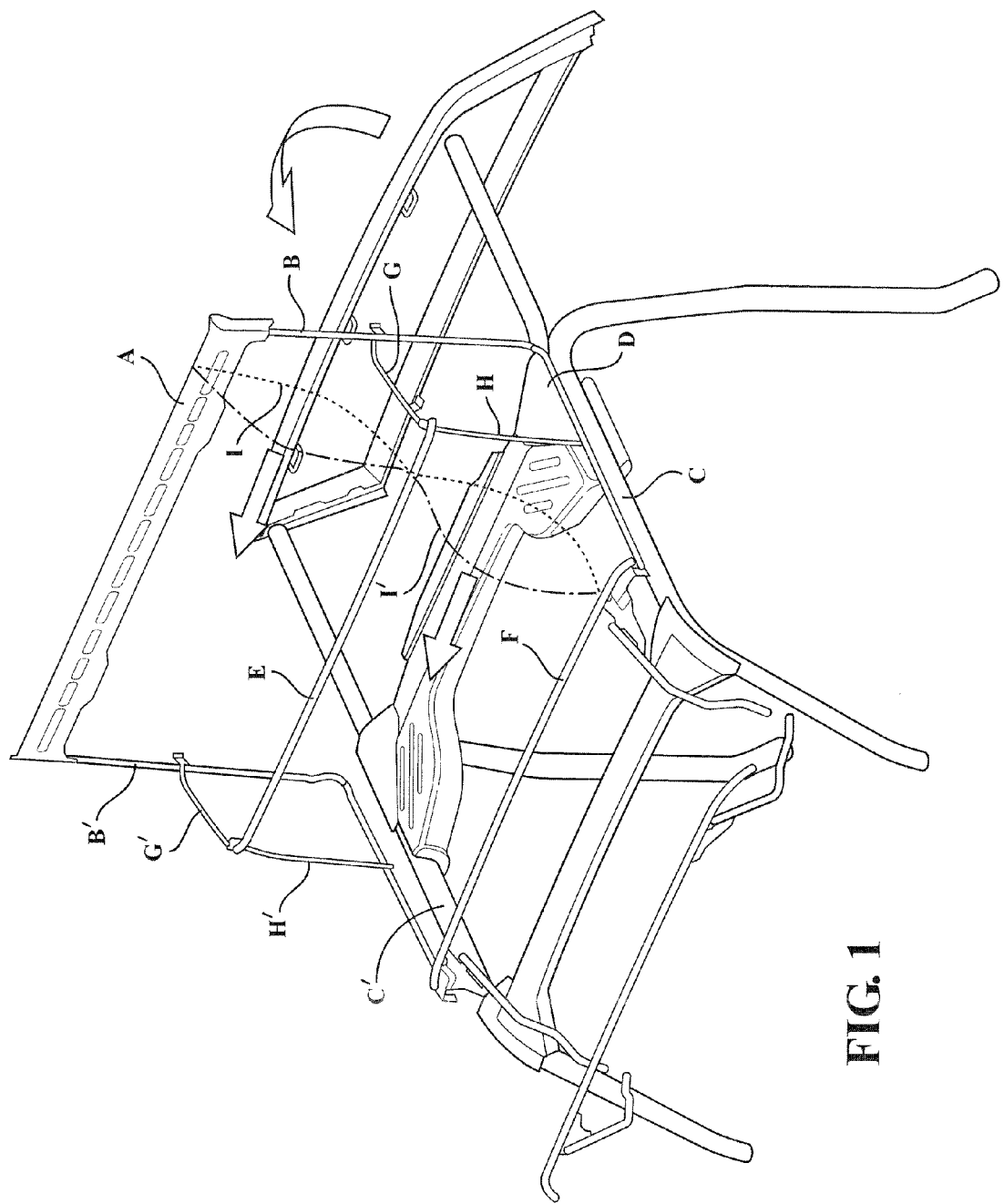
FIG. 1 is a perspective view of a typical sunroof type soft top showing unmanaged soft top material.
Figure 2:
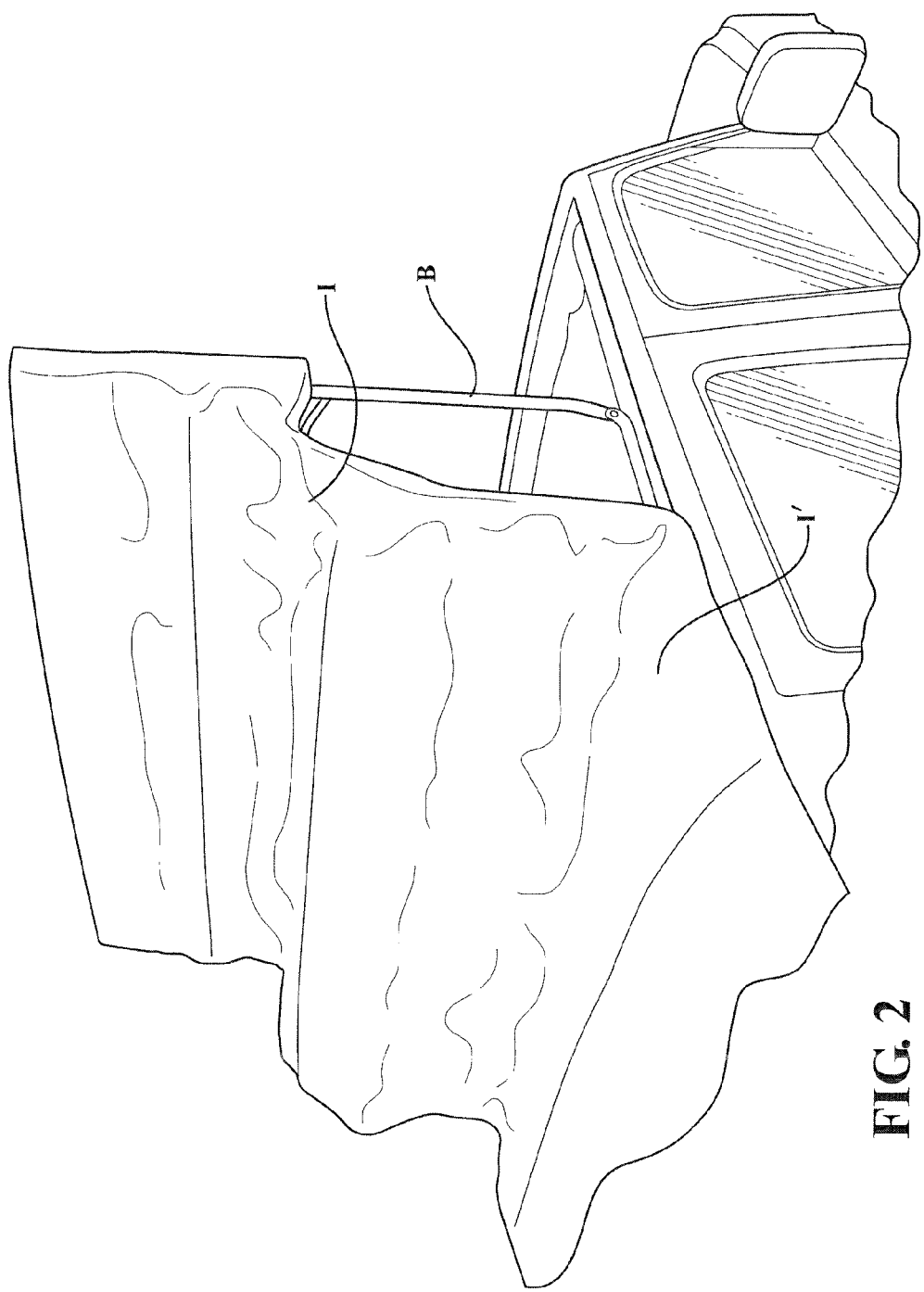
FIG. 2 is a perspective view of the sunroof type soft top of FIG. 1 showing prior fabric management.

Referring to FIG. 1, a typical soft top includes a front bow A which removably connects to the windshield frame of the vehicle and is attached to a pair of pivot arms (B and B'). The pivot arms are pivotally attached to the side rails (C and C') for pivoting at about the roll bar cross-member D such that the "sunroof" portion of the top pivots over the driver and passenger seat area. A cross member bow E is provided which is situated over the cross member D and is approximately midpoint between the front bow A and the rear bow F. Cross member bow E has a pair of pivotal linkages on either side (G,G' and H,H'). These linkages are pivotally connected at about the center of the side rails and pivot arms on either side such that when the pivot arms are raise the cross member bow also comes out past the vehicle cross-member. Since the fabric top is listed to the bow E and rear bow F the fabric extends away but falls where it may, (as shown in phantom by broken lines I and I'). This causes bunching of the fabric or requires manual manipulation of the fabric in order for proper fabric management, e.g., such as pulling the top cover fabric away from either linkages as indicated by the arrows. See also FIG. 2 showing typical fabric management.

Referring to FIGS. 3-7 generally, in accordance with the present invention, there is provided a frame and soft top assembly generally shown at 10 for a vehicle 12. The vehicle 12 includes a windshield frame 14 with side members 16, 18 or vehicle roll bar extending generally therefrom and a crossmember 20 connecting the side members 16, 18 substantially adjacent the rear of the driver passenger compartment 22.

The assembly 10 includes a pivotal sunroof portion generally indicated at 24 and a fixed portion generally indicated at 26. The assembly includes a pair of side rails 28, 30 attached to the side members 16, 18 of said vehicle 12. Typically, the side rails 28 and 30 have a 'U' shaped cross-section and are bolted in the base of the 'U' to the side members 16, 18. However, depending on the application side rails are welded, riveted, secured with adhesive and/or epoxy or otherwise connected depending on the application. Each side rail 28, 30 includes a first end 32 and a second end 34.

A pair of pivot arms 36, 38 are pivotally connected at a first end 40 to the first end 32 of the side rails 28, 30 by way of a pin 33 going through diverging side walls of the 'U' shaped side rails 28, 30 and are connected at the other end 42 of the pivot arms to a first bow member or front bow 44. The bow member 44 is adapted for releaseable attachment to the windshield frame for opening and closing the sunroof portion 24 of the assembly 10. Such attachments are known and are typically a hand actuated clamping arrangement or the like which may be secured for closure of the top and readily released for opening of the sunroof portion. A rear bow member 66 is connected to the side rails 28, 30 at the second end 34 thereof. Also provided is an articulated intermediate bow member 50.

The intermediate bow member 50 is articulatingly connected between the side rail 28 and the pivot arm 36 via a first linkage arm 52 and a second linkage arm 54. One of the linkage arms 52 being connected to the pivot arm 36 and a peripheral end 56 of the intermediate bow 50 and the other of the linkage arms 54 being connected to the side rail 28. The intermediate bow member 50 lies flat in the sunroof closed position and the linkage arms 52, 54 extend the member 50 outward during opening of the sunroof.

First 59 and second 60 fabric assist bow members are provided. The first fabric assist bow member 59 is articulatingly connected for deployment in a position between the intermediate bow 50 and the front bow 44. The bow 59 is connected by way of a first bow assist linkage 62 pivotally attached to the pivot arm 36 and a second bow assist linkage 64 attached to the linkage arms 52 of the intermediate bow 50.

The second fabric assist bow 60 is articulatingly connected for deployment between the intermediate bow member 50 and the rear bow member 66. The second fabric assist bow 60 is connected by way of a third pivotal fabric assist linkage 68 and a fourth fabric assist linkage 70. The third fabric assist linkage 68 being connected to the linkage arm 54 connected to the intermediate member 50 and side rail 28. The fourth fabric assist linkage 70 is pivotally connected to the side rail 28.

Figure 3:
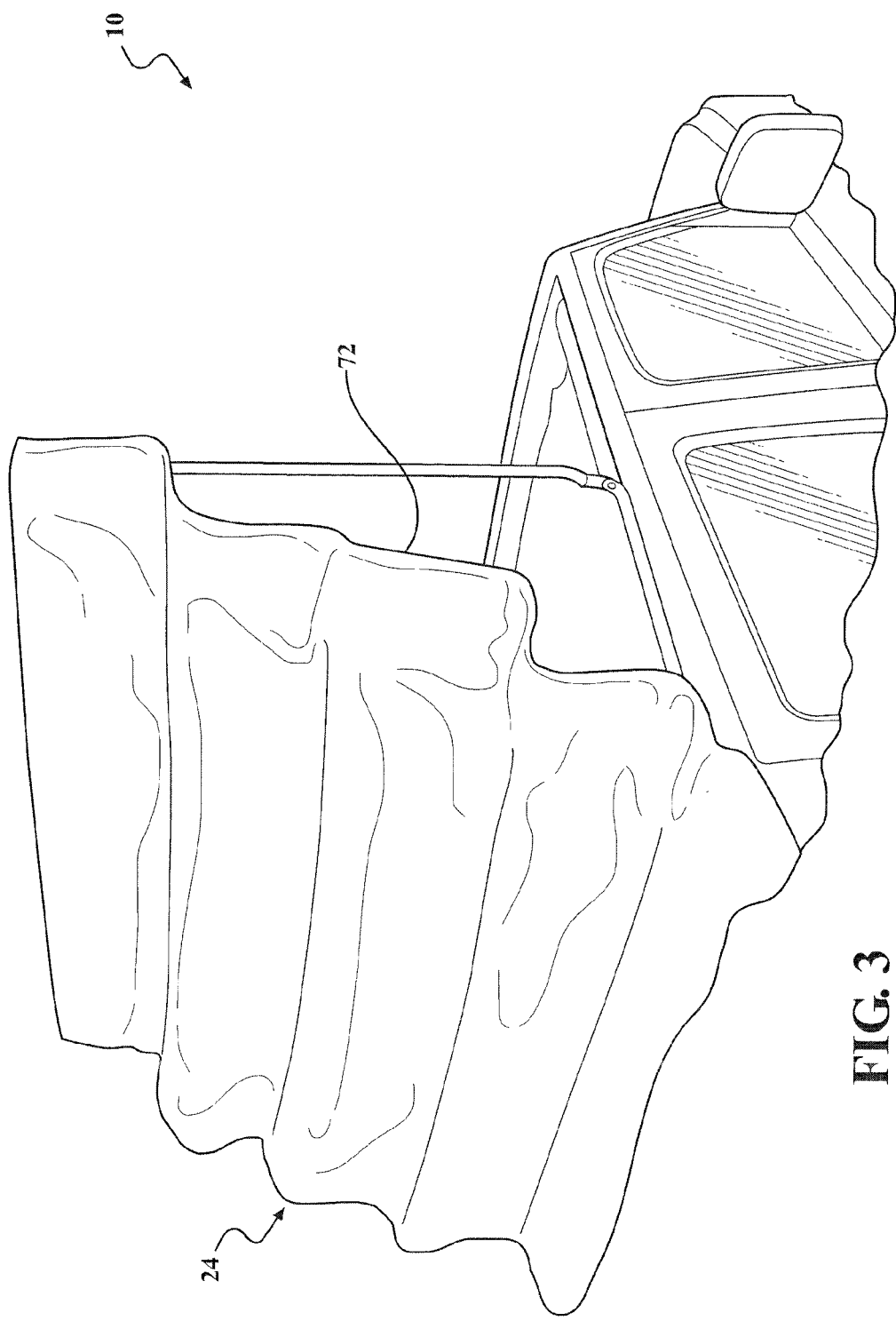
FIG. 3 is a perspective view of a sunroof type soft top of the present invention illustrating improved fabric management.
Figure 4:
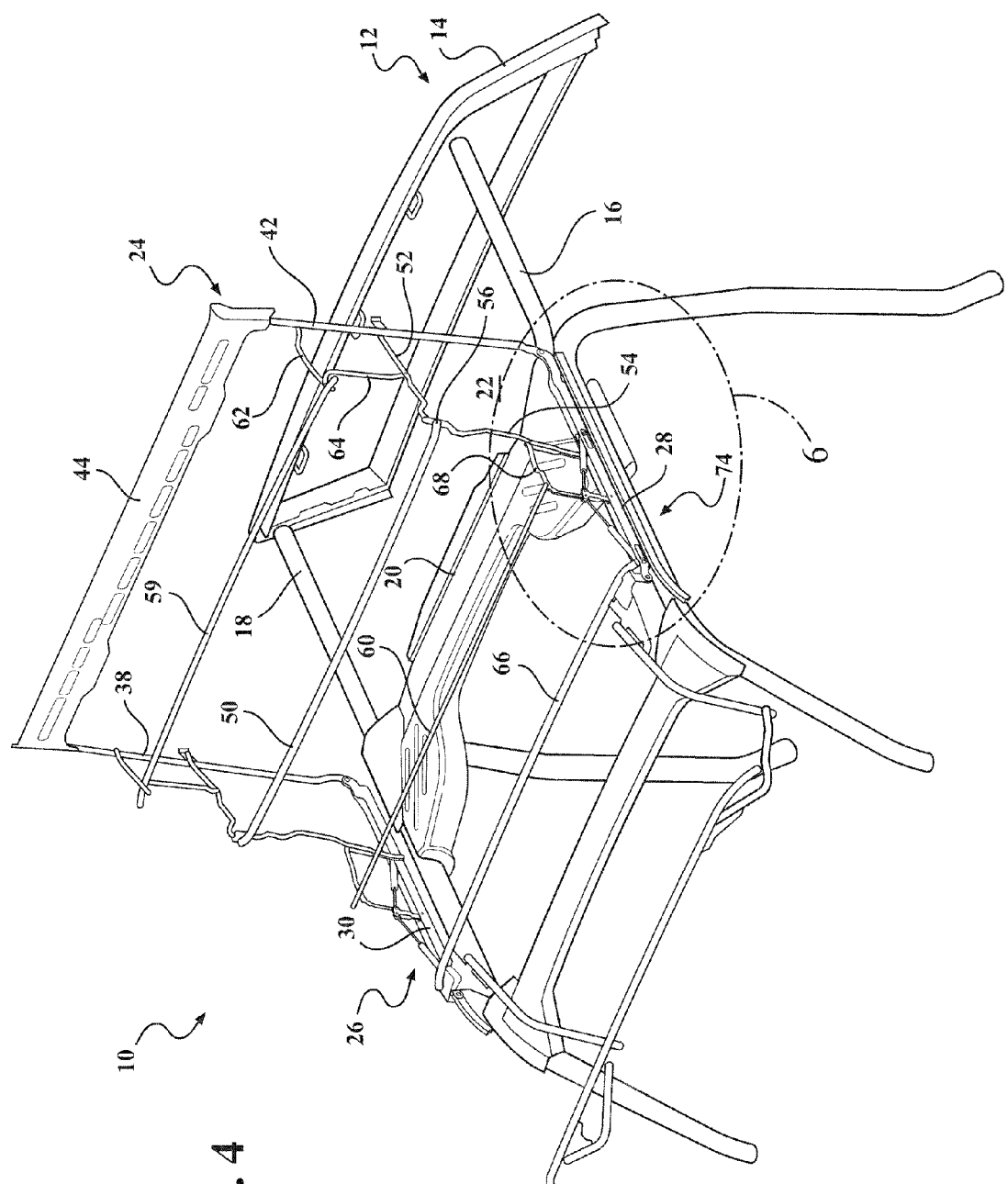
FIG. 4 is a perspective view of the sunroof type soft top assembly of the present invention.

A soft top fabric 72 is listed or otherwise connected to: the front bow member 44; the first fabric assist bow member 59; the intermediate bow member 50; the second fabric assist bow member 60; and, the rear bow member 66, such that when the sunroof portion is raised the fabric 72 is managed and folded by the first and second fabric assist bows 59, 60 and intermediate bow 50 in a folded accordion like manner such as show in FIG. 3. As shown in FIGS. 3 and 4, as the top is lifted up the first, second and intermediate bows 59, 60, 50 extend outward and provide folding of the top material managing the material and carrying the material in a manner away from the folding mechanisms of the top. Very little if any manual management by the operator is necessary when folding the sunroof portion 24 of the top.

Figure 5:
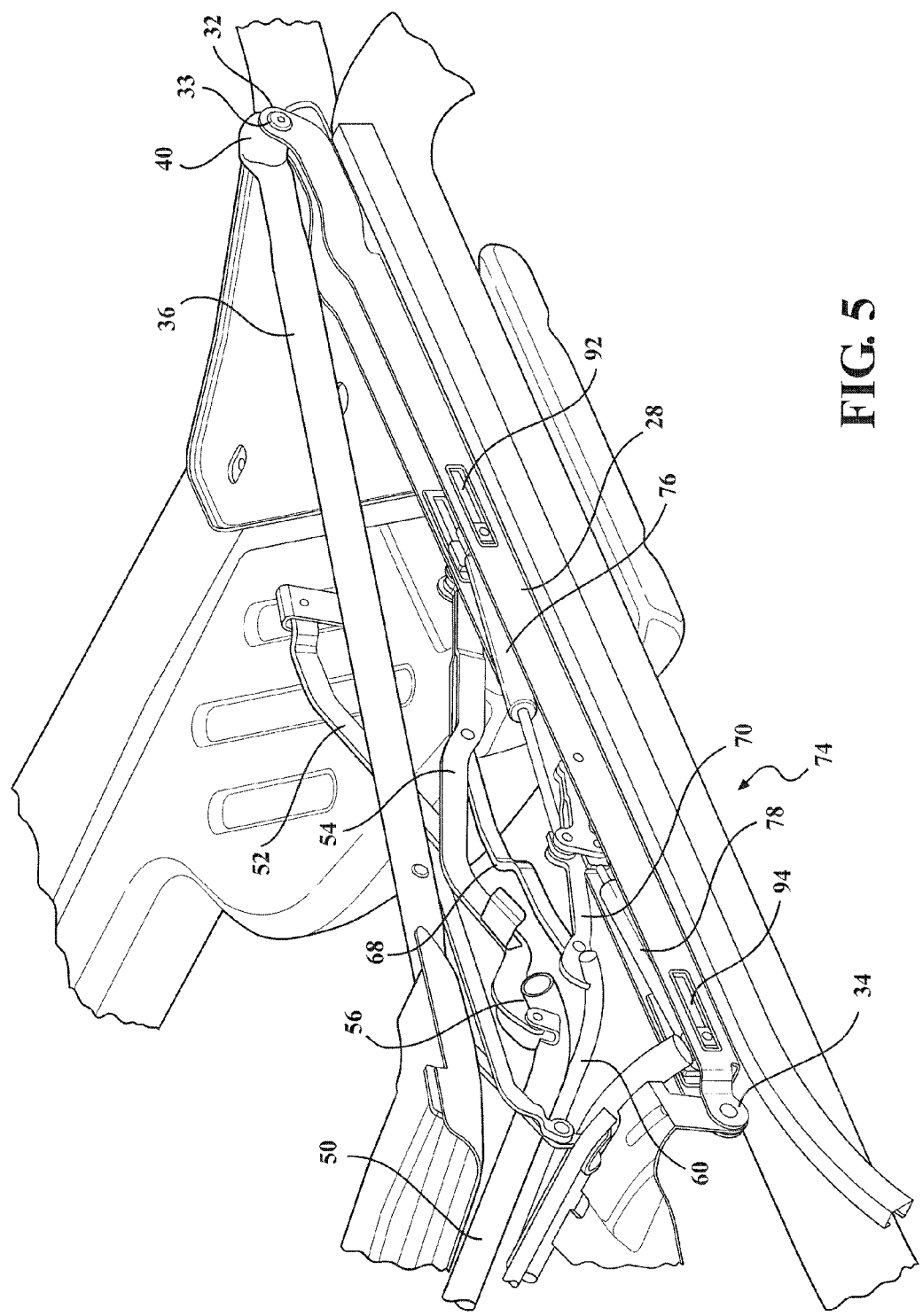
FIG. 5 is a detailed perspective view of the assist mechanism of the sunroof type soft top assembly of the present invention in the middle of the sunroof in the open position.
Figure 6:
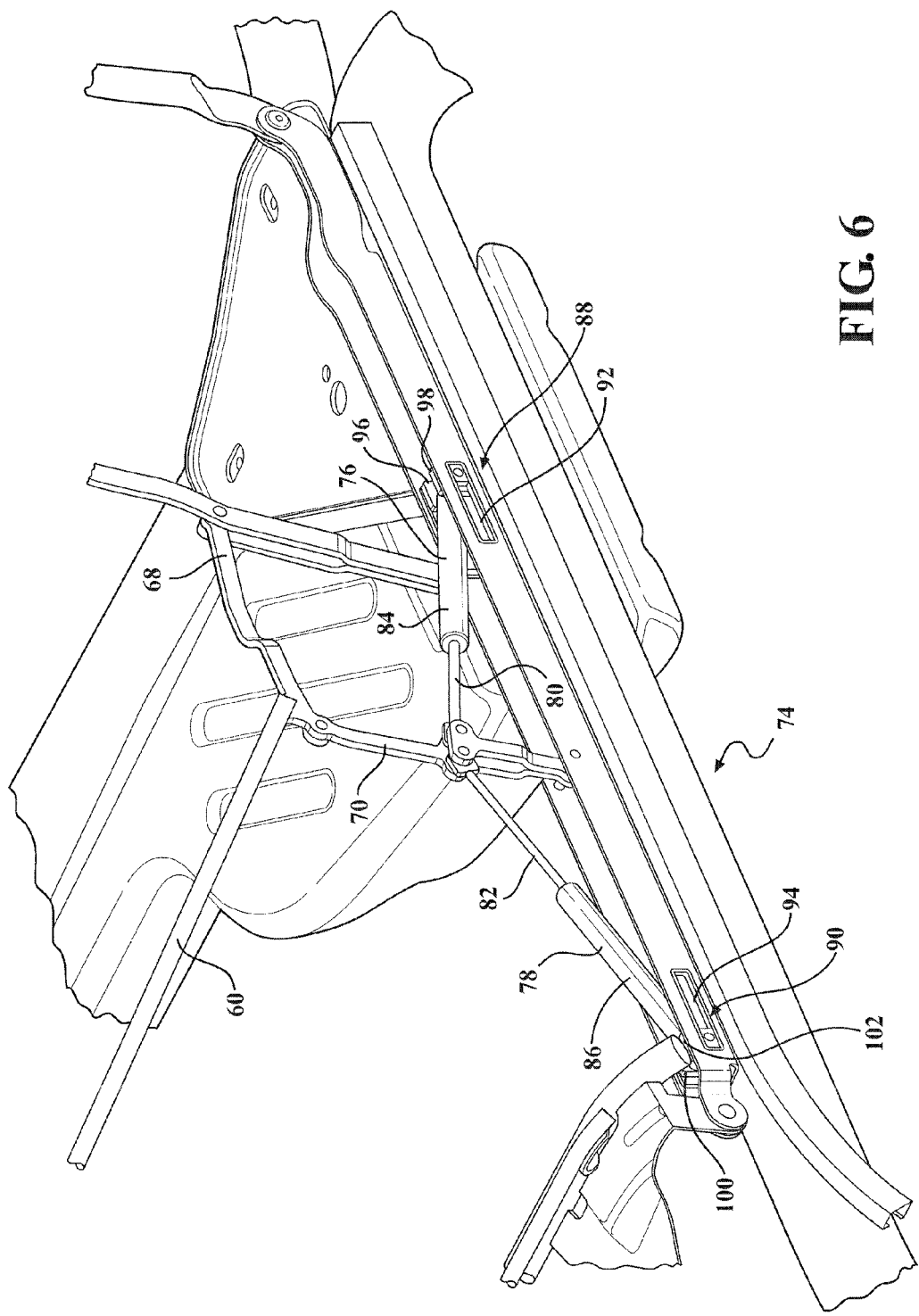
FIG. 6 is a detailed perspective view of the assist mechanism of the sunroof type soft top assembly of the present invention in the opening or closing positions.
Figure 7:
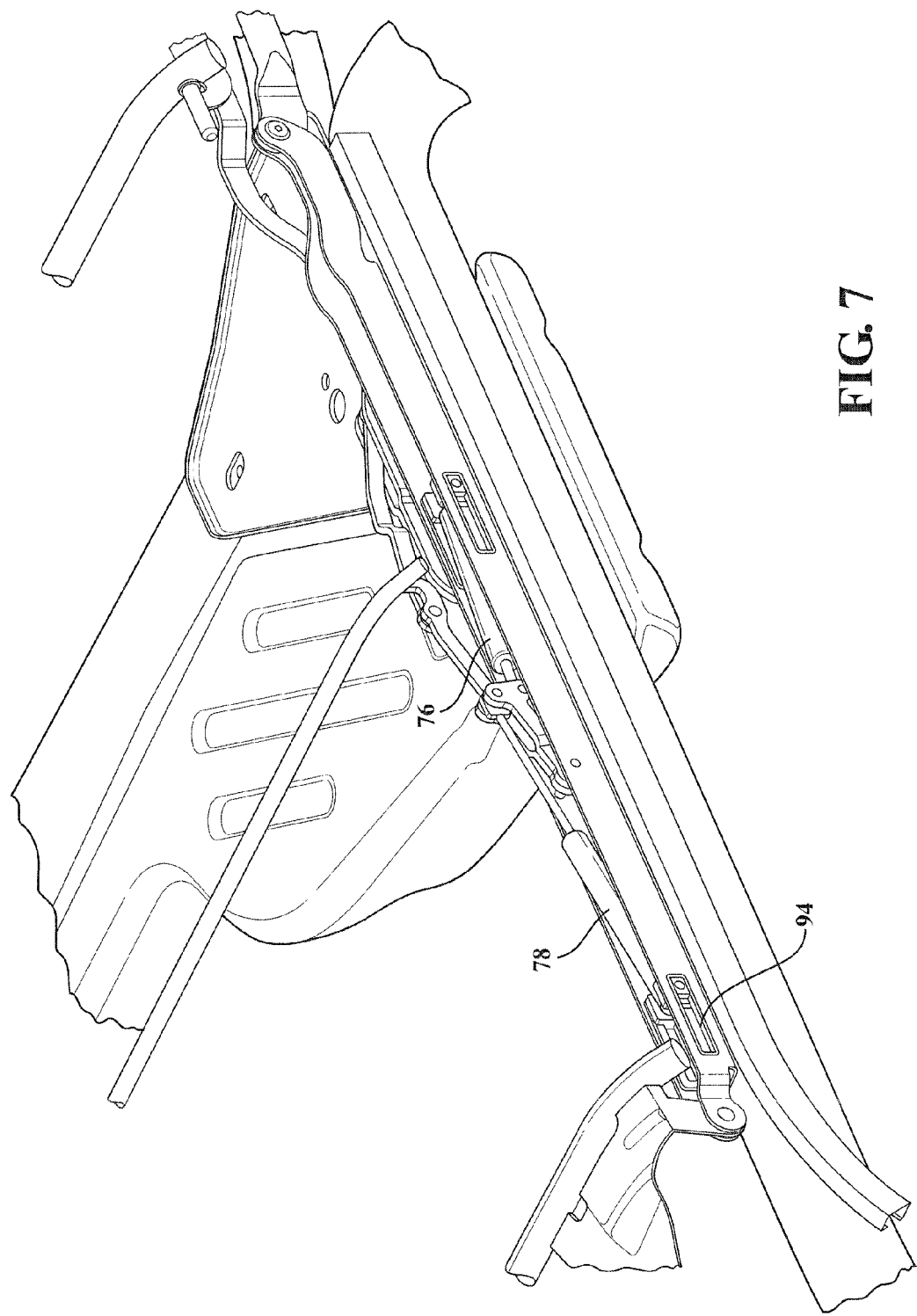
FIG. 7 is a detailed perspective view of the assist mechanism of the sunroof type soft top assembly of the present invention in the closed position.

In a preferred embodiment as shown in detail in FIGS. 5-7, a lift assist mechanism generally indicated at 74 is provided. Lift assist mechanism 74 includes a first gas cylinder 76 and second gas cylinder 78 including respective first 80 and second 82 actuation shafts received in first 84 and second 86 compressed air assist type pneumatic cylinder bodies. The gas struts 76, 78 which are connected in force opposition between said fourth fabric assist linkage 70 and said side rail 28 such that one of the gas cylinders 76 is compressed when the sunroof 24 is down and the other of the gas cylinders 78 is extended. When the sunroof 24 is opened the force in the compressed gas cylinder 76 applies force to the linkage 70 assisting the sunroof in an opening direction. As the sunroof 24 is opening the other cylinder 78 is being compressed and upon closing the sunroof 24 the now compressed cylinder 78 provides force assistance for closing the sunroof 24. This allows assisted opening and closing of the sunroof while the operator is in the vehicle.

The cylinders 76, 78 are attached to the 'U' shaped side rails 28, 30 by way of lost motion arrangements 88, 90. The lost motion arrangements include slots 92 and 94 on either side of the U shaped channel at each location. Bushing members 96, 98 and 100 and 102 are provided to slide in the slots 92, 94. The cylinders 76 and 78 are connected between these bushing members 96, 98 and 100, 102, respectively. This provides lost motion during the initial opening and closing actions of the sunroof. Referring now to FIG. 5, with the sunroof 24 fully open the cylinder 78 is fully compressed and the cylinder 76 is fully extended and has been pulled to the left side of the lost motion slot 92. As the top is closed (or opened) the cylinders are forced to opposite sides of the lost motion slots 92 and 94 such that one cylinder provides dampening and the other provides assist force as shown in FIG. 6. With the sunroof top closed the cylinder 78 is fully extended and pulled to the right side of the lost motion slot 94 as shown in FIG. 7. In the sunroof top closed position, the cylinder 76 is compressed for providing assist during opening.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A frame and soft top assembly for a vehicle having a windshield frame with side members extending therefrom and a crossmember connecting the side members substantially adjacent the rear of the driver passenger compartment, said frame and soft top assembly comprising:

a pair of side rails operably attached to said side members of said vehicle;

a pivotable sunroof soft top portion including a pair of pivot arms pivotally connected to said side rails, where pivoting the pivotable sunroof soft top portion moves said soft top between a closed position and an open position;

a front bow member operably connected to said pivot arms and adapted for removable connection to said windshield frame;

a rear bow member operably connected to said pair of side rails;

an intermediate bow member, said intermediate bow member being articulatingly connected between said side rails and said pivot arms via a first linkage arm and a second linkage arm, one of said linkage arms being operably connected to said pivot arm and a peripheral end of said intermediate bow and the other of said linkage arms being operably connected to said side rail; and a fabric assist bow member articulatingly connected for deployment between said intermediate bow member and said rear bow member by way of a pivotal fabric assist linkage and another fabric assist linkage, said pivotal fabric assist linkage being connected to said one of said first and second linkage arms and said another fabric assist linkage being pivotally connected to said side rail; and a lift assist mechanism comprising a first and second gas cylinder including respective first and second actuation shafts received in first and second cylinder bodies which are connected in force opposition between said another fabric assist linkage and said side rail such that one of said gas cylinders is compressed when said soft top is down and the other of said gas cylinders is extended, wherein when said soft top is opened the force in the compressed gas cylinder applies force to said another fabric assist linkage assisting said soft top in an opening direction and said other cylinder is compressed, and upon closing said soft top the now compressed cylinder provides force assistance for closing said soft top assembly.

2. The frame and soft top assembly of claim 1, further comprising another fabric assist bow member articulatingly connected between said front bow and said intermediate bow by way of a first bow assist linkage pivotally attached to said pivot arm and a second bow assist linkage attached to said one of said first and second linkage arms for said intermediate bow.

3. The frame and soft top assembly of claim 2, wherein said first bow assist linkage is pivotally attached to said pivot arm and said second bow assist linkage is attached to said first linkage arm of said intermediate bow.

4. The frame and soft top assembly of claim 1, wherein said pivotal fabric assist linkage is pivotally attached to said second linkage arm and said another fabric assist linkage is attached to said side rail.

5. The frame and soft top assembly of claim 2, further comprising a soft top fabric listed to at least one of said front bow member, said fabric assist bow member, said intermediate bow member, said another fabric assist bow member, and said rear bow member such that when said soft top portion is raised the soft top fabric is managed and folded by said fabric assist bow member and said another fabric assist bow member in a folded accordion like manner.

6. A frame and soft top assembly for a vehicle having a windshield frame with side members extending therefrom and a crossmember connecting the side members substantially adjacent the rear of the driver passenger compartment, said frame and soft top assembly comprising:

a pair of side rails attached to said side members of said vehicle, each said side rail including a first end and a second end;

a pivotable sunroof soft top portion including a pair of pivot arms pivotally connected at a first end to said first end of said side rails, where pivoting the pivotable sunroof soft top portion moves said soft top between a closed position and an open position;

a front bow connected between respective pivot arms at an outside end of said pivot arms and adapted for removable connection to said windshield frame;

a rear bow member connected to said frame at said second end;

an intermediate bow member, said intermediate bow member being articulatingly connected between said side rails and said pivot arm via a first linkage arm and a second linkage arm, one of said linkage arms being connected to said pivot arm and a peripheral end of said intermediate bow and the other of said linkage arms being connected to said side rail; and a lift assist mechanism comprising a first and second gas cylinder including respective first and second actuation shafts received in first and second cylinder bodies which are connected in force opposition between a fabric assist linkage and said side rail such that one of said gas cylinders is compressed when said soft top is down and the other of said gas cylinders is extended, wherein when said soft top is opened the force in the compressed gas cylinder applies force to the fabric assist linkage assisting said soft top in an opening direction and said other cylinder is compressed, and upon closing said soft top the now compressed cylinder provides force assistance for closing said soft top assembly.

7. The frame and soft top assembly of claim 6, further comprising a fabric assist bow member articulatingly connected for deployment between said intermediate bow member and said rear bow member by way of a pivotal fabric assist linkage and said fabric assist linkage, said pivotal fabric assist linkage being connected to said one of said first and second linkage arms and said fabric assist linkage being pivotally connected to said side rail.

8. The frame and soft top assembly of claim 7, wherein said pivotal fabric assist linkage is pivotally attached to said second linkage arm and said fabric assist linkage is attached to said side rail.

9. The frame and soft top assembly of claim 6, further comprising a first fabric assist bow member articulatingly connected between said front bow and said intermediate bow by way of a first bow assist linkage pivotally attached to said pivot arm and a second bow assist linkage attached to said one of said first and second linkage arms for said intermediate bow.

10. The frame and soft top assembly of claim 9, wherein said first bow assist linkage is pivotally attached to said pivot arm and said second bow assist linkage is attached to said first linkage arm of said intermediate bow.

11. The frame and soft top assembly of claim 6, further comprising a soft top fabric listed to said front bow member, a first fabric assist bow member, said intermediate bow member, a second fabric assist bow member, and said rear bow member such that when said soft top portion is raised the soft top fabric is managed and folded by said first and second fabric assist bow members in a folded accordion like manner.

12. The frame and soft top assembly of claim 6, wherein said first and second gas cylinders are attached to said side rails by way of lost motion arrangements comprising bushing members provided to slide in slots formed in the side rails, said first and second gas cylinders connected between respective bushing members to provide lost motion during initial opening and closing actions of said soft top.

13. A frame and soft top assembly for a vehicle having a windshield frame with side members extending therefrom and a crossmember connecting the side members substantially adjacent the rear of the driver passenger compartment, said frame and soft top assembly comprising:
- a pair of side rails attached to said side members of said vehicle, each said side rail including a first end and a second end;
- a pivotable sunroof soft top portion including a pair of pivot arms pivotally connected at a first end to said first end of said side rails, where pivoting the pivotable sunroof soft top portion moves said soft top between a closed position and an open position;
- a front bow connected between respective pivot arms at an outside end of said pivot arms and adapted for removable connection to said windshield frame;
- a rear bow member connected to said frame at said second end;
- an intermediate bow member, said intermediate bow member being articulatingly connected between said side rails and said pivot arm via a first linkage arm and a second linkage arm, one of said linkage arms being connected to said pivot arm and a peripheral end of said intermediate bow and the other of said linkage arms being connected to said side rail; and
- a lift assist mechanism comprising a first and second gas cylinder which are connected in force opposition such that one of said gas cylinders is compressed when said soft top is down and the other of said gas cylinders is extended, wherein when said soft top is opened the force in the compressed gas cylinder applies force to at least one pair of fabric assist linkages assisting said soft top in an opening direction and said other cylinder is compressed, and upon closing said soft top the now compressed cylinder provides force assistance for closing said soft top assembly.

14. The frame and soft top assembly of claim 13, further comprising a fabric assist bow member articulatingly connected for deployment between said intermediate bow member and said rear bow member by way of a pivotal fabric assist linkage and another fabric assist linkage, said pivotal fabric assist linkage is pivotally attached to said second linkage arm and said another fabric assist linkage is attached to said side rail.

15. The frame and soft top assembly of claim 14, wherein said lift assist mechanism further comprises a respective first and second actuation shafts received in first and second cylinder bodies which are connected in force opposition between said another fabric assist linkage and said side rail such that one of said gas cylinders is compressed when said soft top is down and the other of said gas cylinders is extended, wherein when said soft top is opened the force in the compressed gas cylinder applies force to said another fabric assist linkage assisting said soft top in an opening direction and said other cylinder is compressed, and upon closing said soft top the now compressed cylinder provides force assistance for closing said soft top assembly.

16. The frame and soft top assembly of claim 15, wherein said first and second gas cylinders are attached to said side rails by way of lost motion arrangements comprising bushing members provided to slide in slots formed in the side rails, said first and second gas cylinders connected between respective bushing members.

17. The frame and soft top assembly of claim 13, further comprising a first fabric assist bow member articulatingly connected between said front bow and said intermediate bow by way of a first bow assist linkage pivotally attached to said pivot arm and a second bow assist linkage attached to said first linkage arm of said intermediate bow.

18. The frame and soft top assembly of claim 13, further comprising a soft top fabric listed to said front bow member, a first fabric assist bow member, said intermediate bow member, a second fabric assist bow member, and said rear bow member such that when said soft top portion is raised the soft top fabric is managed and folded by said first and second fabric assist bow members in a folded accordion like manner.

* * * * *